US009024516B2

(12) United States Patent
Chen et al.

(10) Patent No.: US 9,024,516 B2
(45) Date of Patent: May 5, 2015

(54) METHOD FOR FABRICATING A PLANAR MICRO-TUBE DISCHARGER STRUCTURE

(71) Applicant: Amazing Microelectronic Corp., New Taipei (TW)

(72) Inventors: Tung-Yang Chen, Jhubei (TW); Ming-Dou Ker, Jhu-bei (TW); Ryan Hsin-Chin Jiang, Taipei (TW)

(73) Assignee: Amazing Microelectronic Corp., New Taipei (TW)

( * ) Notice: Subject to any disclaimer, the term of this patent is extended or adjusted under 35 U.S.C. 154(b) by 31 days.

(21) Appl. No.: 14/109,297

(22) Filed: Dec. 17, 2013

(65) Prior Publication Data

US 2014/0106064 A1 Apr. 17, 2014

Related U.S. Application Data

(62) Division of application No. 13/464,506, filed on May 4, 2012, now Pat. No. 8,829,775.

(30) Foreign Application Priority Data

Feb. 24, 2012 (TW) ............................. 101106427 A

(51) Int. Cl.

| | |
|---|---|
| ***H01J 1/88*** | (2006.01) |
| ***H01J 19/42*** | (2006.01) |
| ***H01K 1/18*** | (2006.01) |
| ***H02H 9/00*** | (2006.01) |
| ***H01H 47/00*** | (2006.01) |
| ***H05F 3/00*** | (2006.01) |
| ***H01J 9/02*** | (2006.01) |
| ***H01J 17/06*** | (2006.01) |

(52) U.S. Cl.
CPC *H01J 9/02* (2013.01); *H01J 17/066* (2013.01)

(58) Field of Classification Search
CPC .................................. H01J 9/02; H01J 17/066
See application file for complete search history.

(56) References Cited

U.S. PATENT DOCUMENTS

| | | | | |
|---|---|---|---|---|
| 4,680,665 | A | 7/1987 | Bonnesen et al. | |
| 7,034,652 | B2 * | 4/2006 | Whitney et al. | 338/223 |
| 7,196,406 | B2 | 3/2007 | Kuzmenka | |
| 2011/0222203 | A1 * | 9/2011 | Adachi et al. | 361/220 |
| 2012/0134059 | A1 * | 5/2012 | Sumi et al. | 361/56 |
| 2012/0169452 | A1 * | 7/2012 | Hiehata et al. | 338/21 |
| 2012/0250196 | A1 * | 10/2012 | Sumi et al. | 361/56 |
| 2014/0353799 | A1 * | 12/2014 | Hwang | 257/577 |

FOREIGN PATENT DOCUMENTS

| | | |
|---|---|---|
| TW | I231637 B | 4/2005 |
| TW | I253881 B | 4/2006 |
| TW | M377783 | 4/2010 |

* cited by examiner

*Primary Examiner* — Donald Raleigh
(74) *Attorney, Agent, or Firm* — Muncy, Geissler, Olds & Lowe, P.C.

(57) ABSTRACT

A method for fabricating a semiconductor-based planar micro-tube discharger structure is provided, including the steps of forming on a substrate two patterned electrodes separated by a gap and at least one separating block arranged in the gap, forming an insulating layer over the patterned electrodes and the separating block, and filling the insulating layer into the gap. At least two discharge paths are formed. The method can fabricate a plurality of discharge paths in a semiconductor structure, the structure having very high reliability and reusability.

14 Claims, 19 Drawing Sheets

METHOD FOR FABRICATING A PLANAR MICRO-TUBE DISCHARGER STRUCTURE

CROSS REFERENCE TO RELATED APPLICATIONS

This application is a Divisional of co-pending application Ser. No. 13/464,506, filed on May 4, 2012, for which priority is claimed under 35 U.S.C. §120; and this application claims priority of Application No. 101106427 filed in Taiwan. R.O.C. on Feb. 24, 2012 under 35 U.S.C. §119; the entire contents of all of which are hereby incorporated by reference.

BACKGROUND OF THE INVENTION

1. Field of the Invention

The present invention relates to a semiconductor technology, particularly to a semiconductor-based planar micro-tube discharger structure and a method for fabricating the same.

2. Description of the Related Art

When connected with a long signal line, power cable or antenna, an electronic device is exposed to a transient phenomenon caused by inductance. The inductance is generated by lightning or electromagnetic pulses. An electric surge arrester protects an electronic device against the transient phenomenon via absorbing electric energy or grounding the electronic device. An electric surge arrester should be able to protect an electronic device against the transient phenomenon automatically and repeatedly and able to recover autonomously.

A gas tube is normally used to protect electronic devices but is also used as a switch device of a power switching circuit of such as a reel assembly or a vehicular gas discharge headlight. Refer to FIG. 1 for an early-stage gas tube. The conventional gas tube comprises two solid-state electrodes 10 arranged at two ends of a tube 12 and separated by a gaseous gap 14 or a mica layer. The gas tube only has a single gas discharge path. The electrodes 10 will be gradually shortened during long-term use. Thus, the distance between two electrodes 10 will increase gradually. Finally, the electric field between the two electrodes 10 becomes insufficient to induce electric discharge. Further, the distance between the two electrodes 10 is hard to precisely control in fabrication. Such a problem results in that the actual breakdown voltage of the gas tube is often deviated from the nominal breakdown voltage by several folds. Therefore, the conventional gas tube is hard to protect ordinary electronic products working at low voltage but only suitable to protect against great electric surges in a high voltage environment. Therefore, the conventional gas tube lacks sufficient reliability and reusability but has a very high dropout rate.

Accordingly, the present invention proposes a semiconductor-based planar micro-tube discharger structure and a method for fabricating the same to overcome the abovementioned problems.

SUMMARY OF THE INVENTION

The primary objective of the present invention is to provide a planar micro-tube discharger structure and a method for fabricating the same, wherein a separating block is arranged between two electrodes to establish at least two discharge paths, whereby the micro-tube discharger has high reliability and high reusability.

To realize the abovementioned objective, the present invention proposes a planar micro-tube discharger structure, which comprises a substrate; two patterned electrodes arranged on the substrate and separated by a gap; at least one separating block arranged in the gap and made of a metallic or insulating material; and an insulating layer formed over the patterned electrodes and the separating block and filled into the gap to create at least two discharge paths. The patterned electrodes discharge via the discharge paths. When made of a metallic material, the separating block can stabilize the current direction under a fixed electric field.

The present invention also proposes a method for fabricating a planar micro-tube discharger structure, which comprises steps: forming two patterned electrodes separated by a gap and at least one separating block arranged in the gap and made of a metallic or insulating material; forming an insulating layer over the patterned electrodes and the separating block and filling the insulating layer into the gap to create at least two discharge paths interconnecting the patterned electrodes. When made of a metallic material, the separating block can stabilize the current direction under a fixed electric field.

Below, embodiments are described in detail in cooperation with drawings to make easily understood the technical contents, characteristics and accomplishments of the present invention.

DETAILED DESCRIPTION OF THE INVENTION

Figure 2:
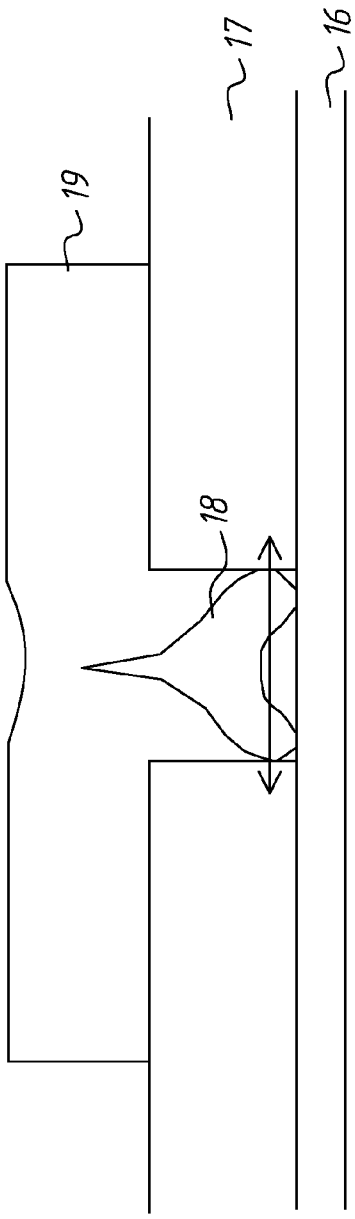
FIG. 2 is a sectional view schematically showing that an insulating layer is deposited on a thinner metallic layer having a wider gap according to the present invention.
Figure 3:
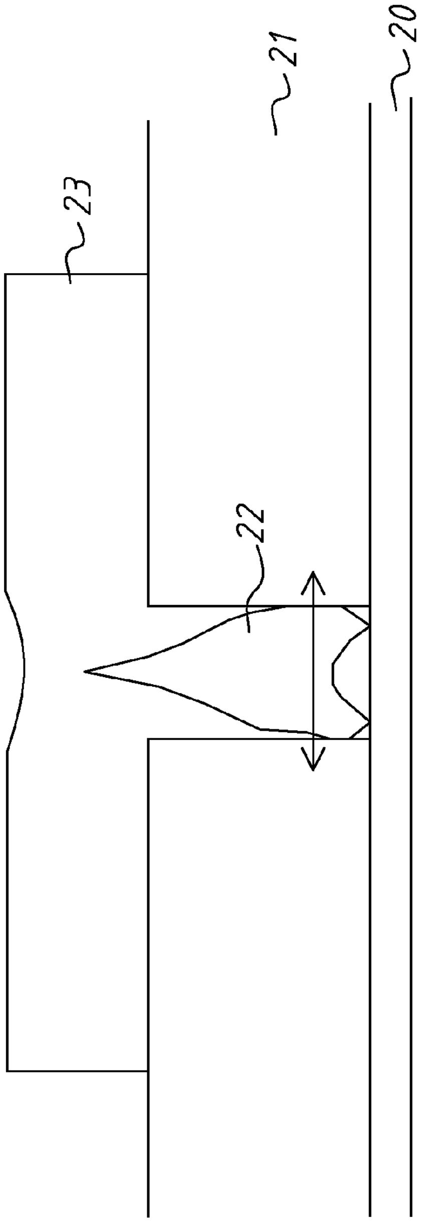
FIG. 3 is a sectional view schematically showing that an insulating layer is deposited on a thicker Metallic layer having a narrower gap according to the present invention.

Firstly is introduced the principle of the present invention. Refer to FIG. 2 and FIG. 3. In FIG. 2, a metallic layer 17 is formed on a substrate 16. The metallic layer 17 has a gap 18. An insulating layer 19 is deposited on the metallic layer 17 with a chemical vapor deposition method. As the gap 18 is not wide and has a high step ratio, the insulating layer 19 has a cavity in the gap 18. In FIG. 3, a metallic layer 21 is formed on a substrate 20. The metallic layer 21 has a gap 22. An insulating layer 23 is deposited on the metallic layer 21 with a chemical vapor deposition method. The metallic layer 21 is thicker than the metallic layer 17, and the gap 22 is narrower than the gap 18. Therefore, the step ratio in FIG. 3 is higher than the step ratio in FIG. 2. Thus, a cavity is more likely to form in the gap 22. In other words, the higher the step ratio of a gap is, the more likely a cavity is formed in the gap, which is exactly the principle that the present invention is based on.

Figure 4:
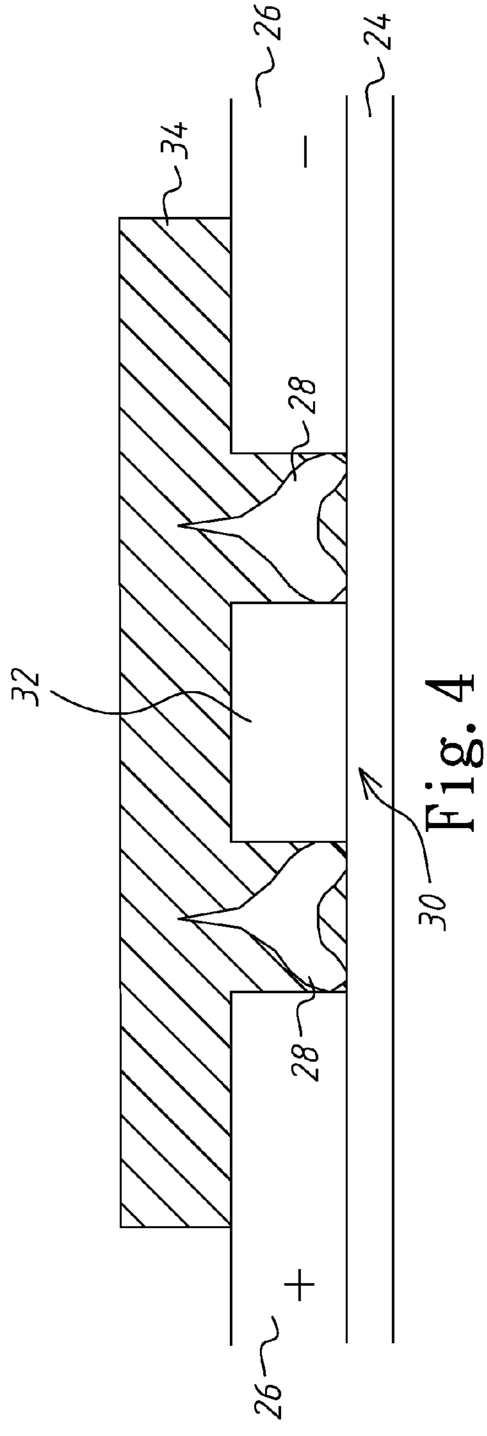
FIG. 4 is a sectional view schematically showing a planar micro-tube discharger structure according to a first embodiment of the present invention.
Figure 5:
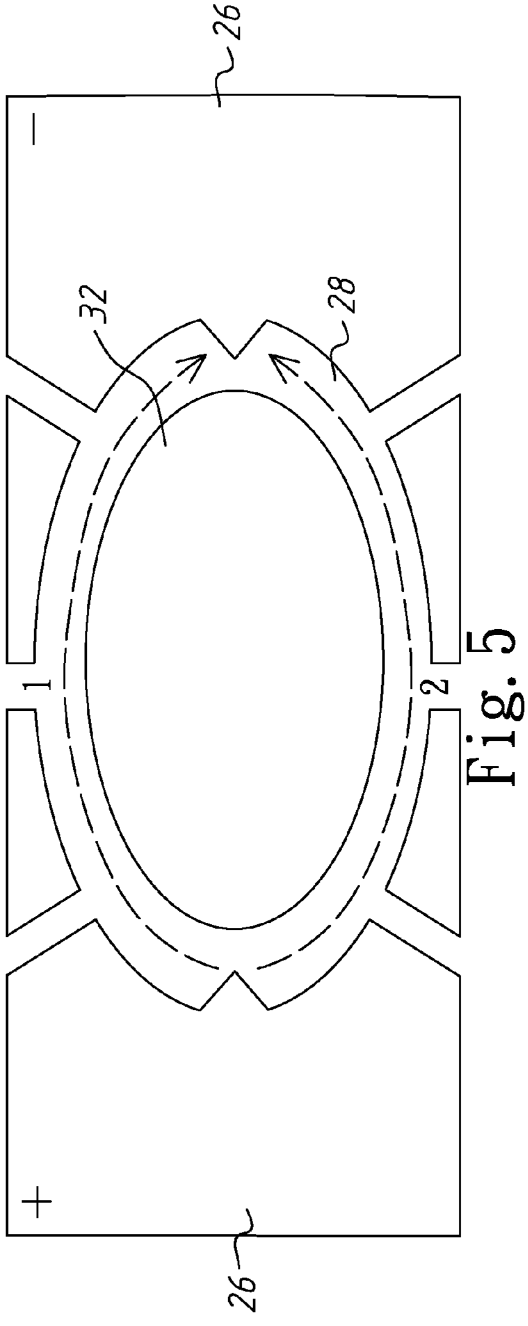
FIG. 5 is a diagram schematically showing patterned electrodes and a separating block of the planar micro-tube discharger structure according to the first embodiment of the present invention.

Below is introduced a first embodiment. Refer to FIG. 4 and FIG. 5. In the first embodiment, the planar micro-tube discharger structure comprises a substrate 24 made of silicon; two patterned electrodes 26 made of a metallic material, formed on the substrate 24 and separated by a gap 28; at least one separating block 30 in form of a metallic block 32, arranged in the gap 28, and not connected with any electric potential; a first insulating layer 34 comprises silicon dioxide or silicon nitride. The first insulating layer 34 is formed over the patterned electrodes 26 and the separating block 30, and filled into the gap 28 originally containing air or inert gas. The air or inert gas in the gap 28 facilitates formation of at least two discharge paths. The patterned electrodes 26 discharge via the discharge paths. In the first embodiment, the planar micro-tube discharger structure has one separating block 30 and two discharge paths. When the potential of the two patterned electrodes 26 reaches the breakdown electric field intensity, tip discharge occurs. As the breakdown electric field intensity of vacuum or air is 100 times smaller than that of silicon dioxide or silicon nitride, the discharge current proceeds from one tip to another tip along the discharge paths generated by the step ratio of the gap. As not all tips discharge, it is unnecessary to demand absolute structural uniformity of the discharge paths. Electric discharge inevitably produces by-products blocking the discharge paths. However, the present invention can form many discharge paths in the plane. Therefore, the present invention outperforms the conventional gas tube in reliability and reusability.

In the first embodiment, the gap 28 does not contain any material except air. Alternatively, the gap 28 may be filled with a low-permittivity layer, and the first insulating layer 34 is formed over the low-permittivity layer, whereby discharge paths are created along the low-permittivity layer. The permittivity of the low-permittivity layer should be lower than that of the first insulating layer 34 and higher than that of the patterned electrodes 26.

Figure 6A:
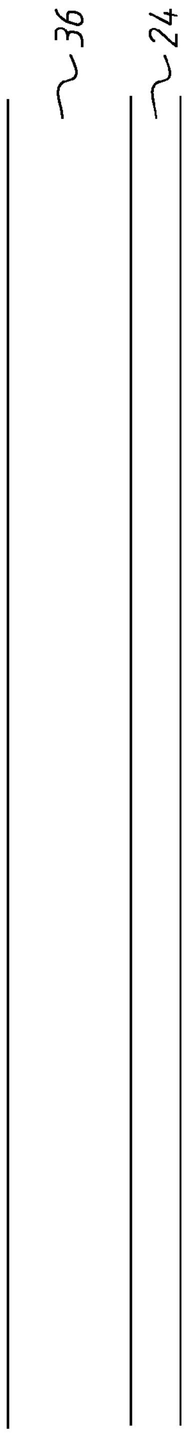
FIGS. 6(*a*)-6(*c*) are sectional views schematically showing the steps of fabricating the planar micro-tube discharger structure according to the first embodiment of the present invention.
Figure 6B:
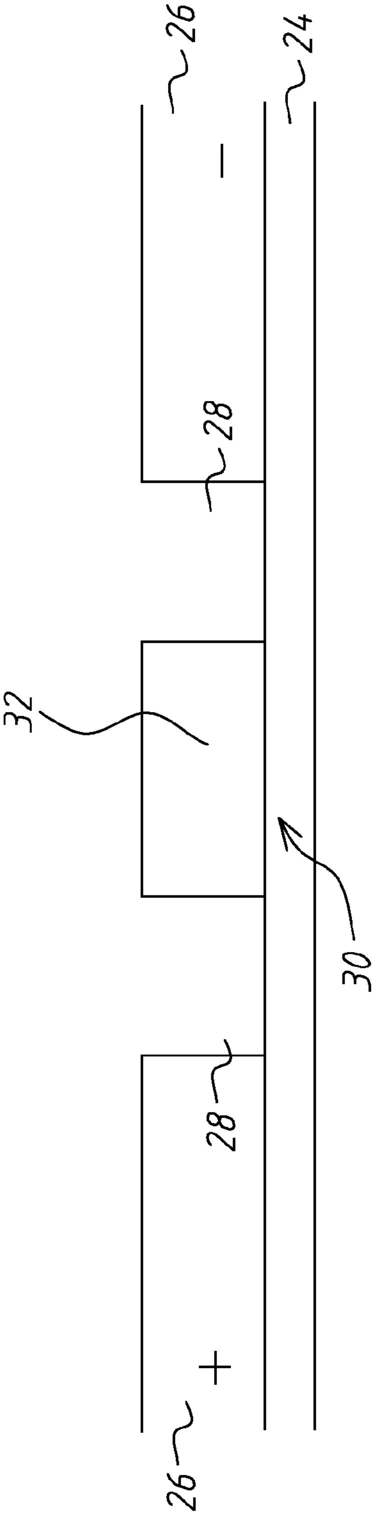
Figure 6C:
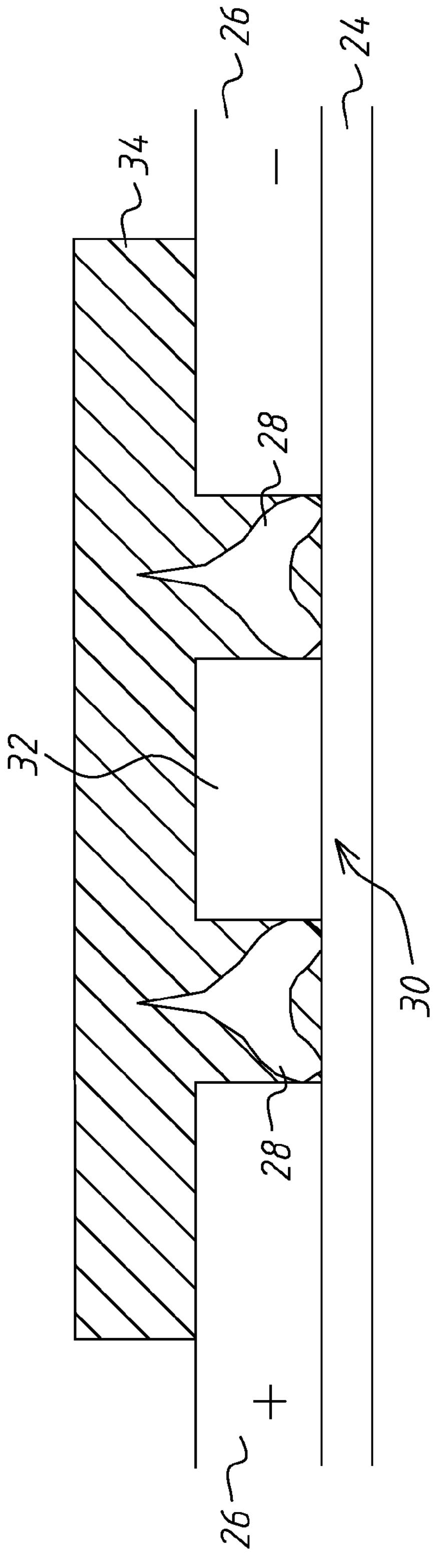

Below is introduced the process of fabricating the planar micro-tube discharger structure of the first embodiment. Refer to FIGS. 6(*a*)-6(*c*). Firstly, form a metallic layer 36 on a substrate 24, as shown in FIG. 6(*a*). Next, remove a portion of the metallic layer 36 to form patterned electrodes 26 and a metallic block 32 on the substrate 24, wherein the patterned electrodes 26 are separated by a gap 28, and wherein the metallic block 32 is arranged in the gap 28, as shown in FIG. 6(*b*). Next, use a CVD (Chemical Vapor Deposition) method to form a first insulating layer 34 over the patterned electrodes 26 and the metallic block 32 and fill the insulating layer 34 into the gap 28, whereby air or inert gas is trapped in the gap 28 to function as the discharge paths interconnecting the patterned electrodes 26, as shown in FIG. 6(*c*).

The discharge paths may be alternatively realized with a low-permittivity layer. After the step of FIG. 6(*b*), a low-permittivity layer is formed in the gap 28, neighboring the patterned electrodes 26 and the metallic block 32. Next, the first insulating layer 34 is formed over the patterned electrodes 26, the metallic block 32 and the low-permittivity layer. Thus, the low-permittivity layer functions as the discharge paths.

Figure 7:
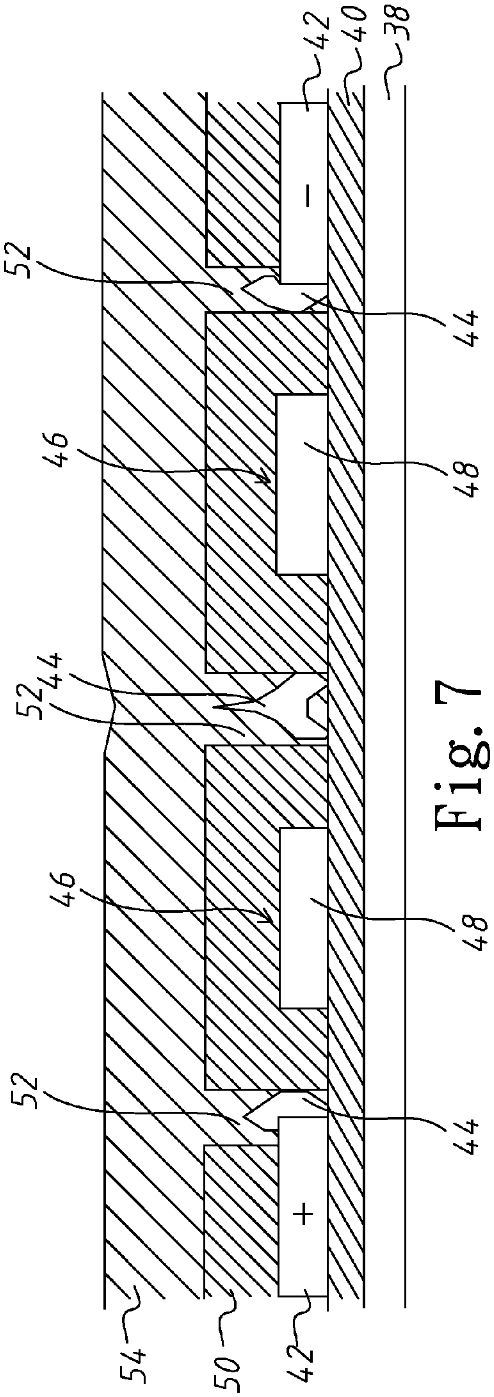
FIG. 7 is a sectional view schematically showing a planar micro-tube discharger structure according to a second embodiment of the present invention.
Figure 8:
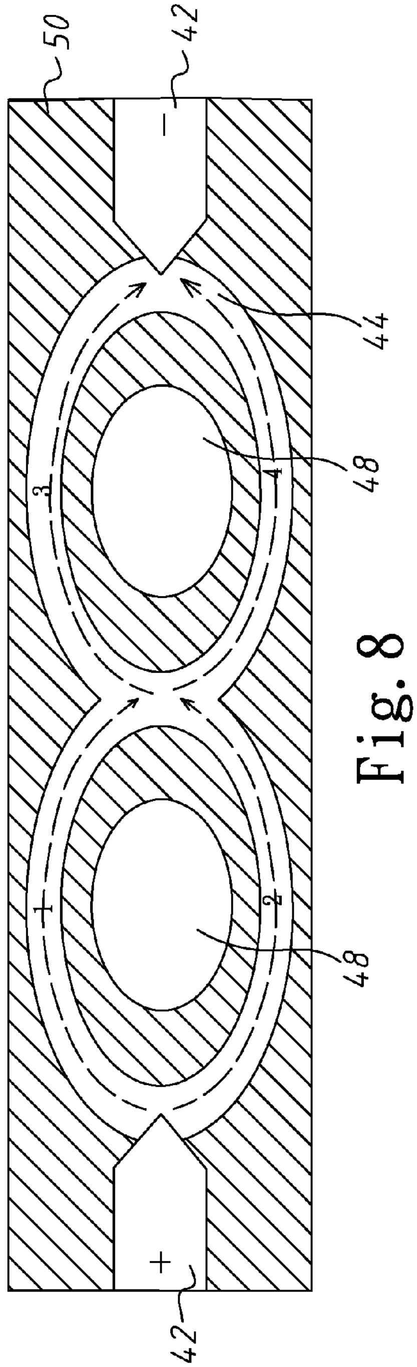
FIG. 8 is a diagram schematically showing patterned electrodes, separating blocks and a first sub-insulating layer of the planar micro-tube discharger structure according to the second embodiment of the present invention.

Below is introduced a second embodiment. Refer to FIG. 7 and FIG. 8. In the second embodiment, the planar micro-tube discharger structure comprises a substrate 38 made of silicon; a second insulating layer 40 comprising silicon dioxide or silicon nitride and formed on the substrate 38; two patterned electrodes 42 made of a metallic material arid separated by a gap 44; at least one separating block 46 in form of a metallic block 48 arranged in the gap 44 and connected with an electrical potential or disconnected from any electric potential; a first sub-insulating layer 50 formed over the patterned electrodes 42 and the separating block 46, filled into the gap 44, and having a groove 52 located in the gap 44 and interconnecting the patterned electrodes 42; and a second sub-insulating layer 54 formed over the first sub-insulating layer 50 and filled into the groove 52. The first sub-insulating layer 50 and the second sub-insulating layer 54 comprise silicon dioxide or silicon nitride. The groove 52 has air or inert gas. Air or inert gas is trapped in the groove 52 by the second sub-insulating layer 54 to form at least two discharge paths. Thereby, the patterned electrodes 42 can discharge via the discharge paths. In the second embodiment, the planar micro-tube discharger structure has two separating block 30 and four discharge paths. The operation of the second embodiment is similar to that of the first embodiment. When the potential of the two patterned electrodes 26 reaches the breakdown electric field intensity of the gap 44, tips discharge with the discharge current proceeding from one tip to another tip along the discharge paths. As the separating block 46 is a metallic block 48, the separating block 46 can establish an electric filed between electrodes to stabilize the current direction under a fixed electric field.

In the second embodiment, the gap 44 does not contain any material except air. Alternatively, a low-permittivity layer may be filled into the gap 44, and the second sub-insulating layer 54 is formed over the low-permittivity layer, whereby discharge paths are created along the low-permittivity layer. The permittivity of the low-permittivity layer should be lower than that of the first sub-insulating layer 50 and the second sub-insulating layer 54 and higher than that of the patterned electrodes 42.

Figures 9A, 9B, 9C:
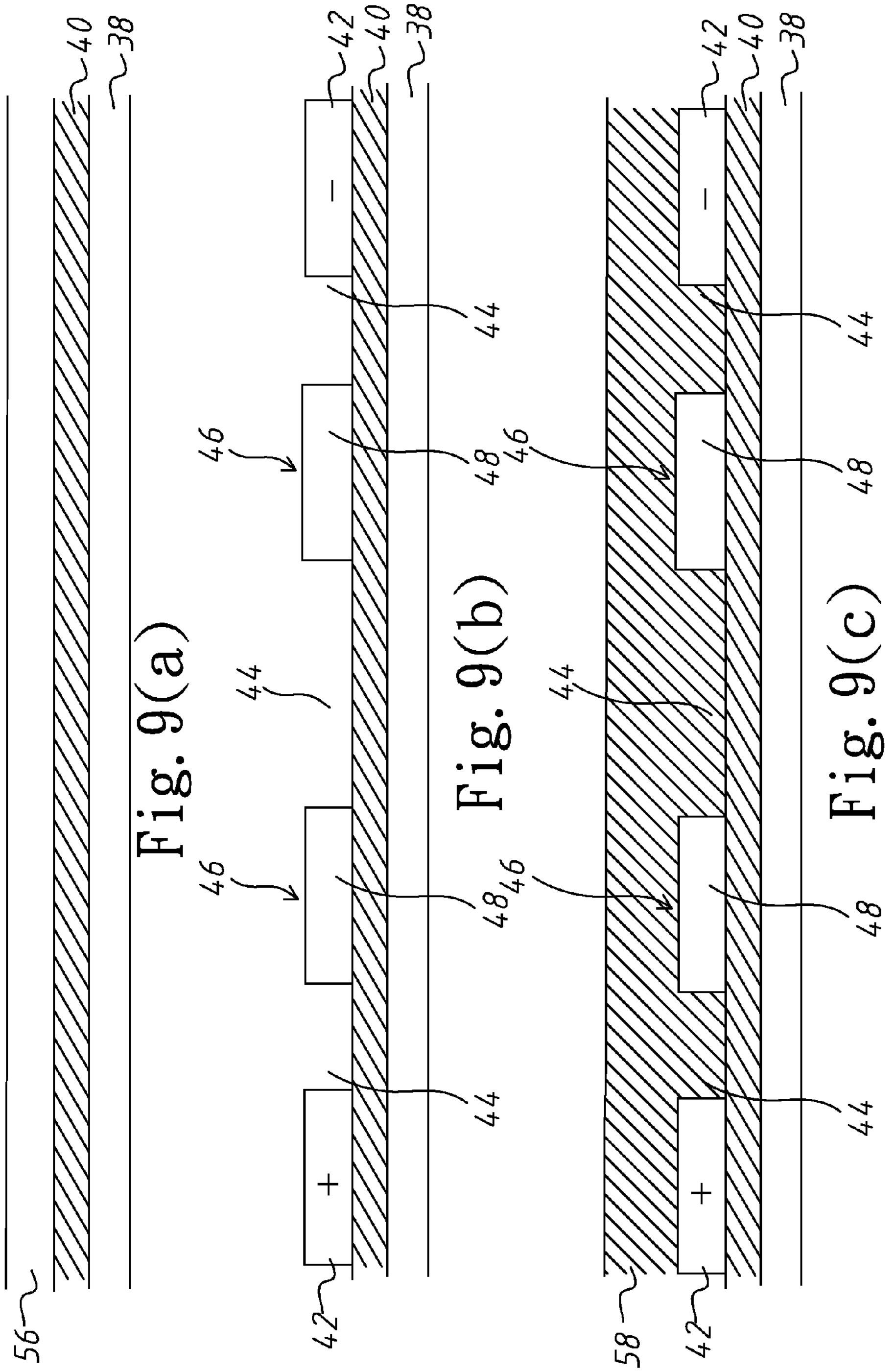
FIGS. 9(*a*)-9(*e*) are sectional views schematically showing the steps of fabricating the planar micro-tube discharger structure according to the second embodiment of the present invention.
Figure 9D:
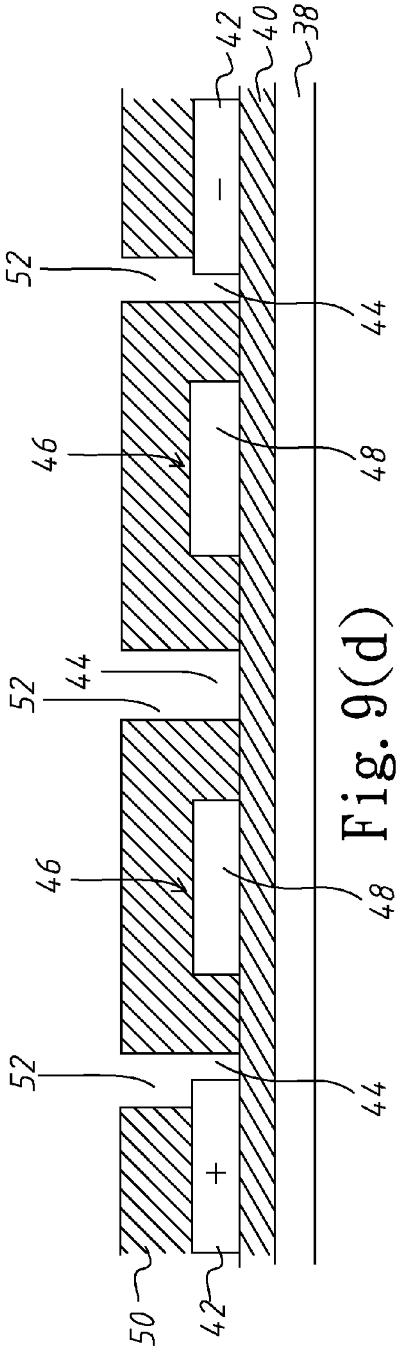
Figure 9E:
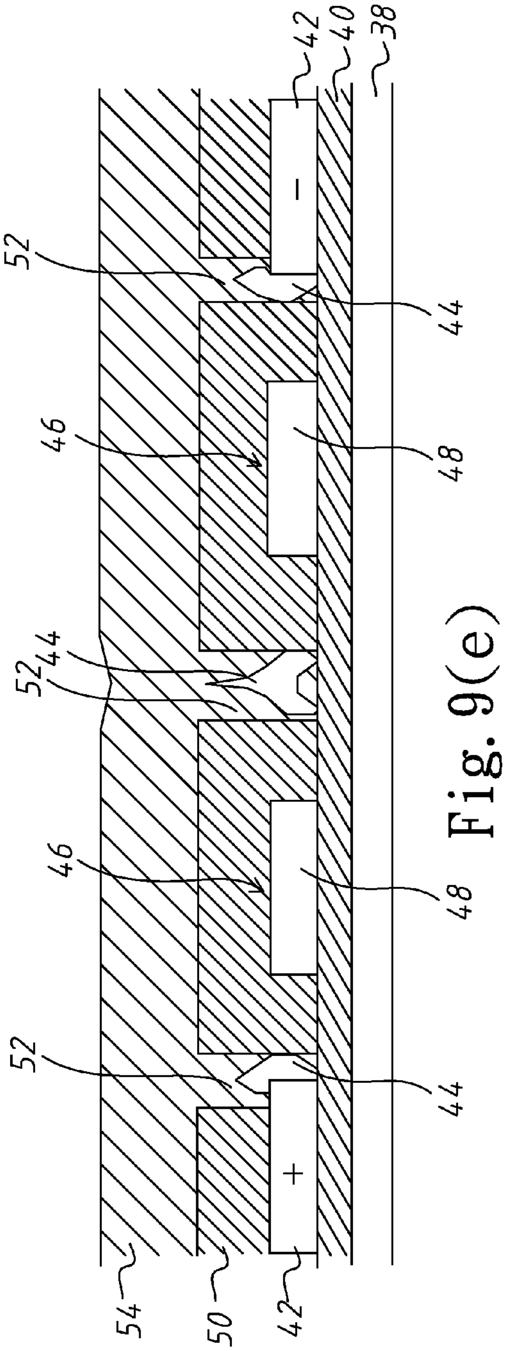

Below is introduced the process of fabricating the planar micro-tube discharger structure of the second embodiment. Refer to FIGS. 9(*a*)-9(*e*). Firstly, sequentially form a second insulating layer 40 and a metallic layer 56 on a substrate 38, as shown in FIG. 9(*a*). Next, remove a portion of the metallic layer 56 to form patterned electrodes 42 and metallic blocks 48 on the substrate 38, wherein the patterned electrodes 42 are separated by a gap 44, and wherein the metallic blocks 48 are arranged in the gap 44, as shown in FIG. 9(*b*). Next, form an inner insulating layer 58 over the patterned electrodes 42 and the metallic blocks 48 and fill the inner insulating layer 58 into the gap 44, as shown in FIG. 9(*c*). Next, remove a portion of the inner insulating layer 58 in the region of the gap 44 to form over the patterned electrodes 42 and the metallic block 48 a first sub-insulating layer 50 having a groove 52 interconnecting the patterned electrodes 42, as shown in FIG. 9(*d*). Next, use a CVD method to form a second sub-insulating layer 54 over the first sub-insulating layer 50 and fill the second sub-insulating layer 54 into the groove 52, whereby air or inert gas is trapped in the groove 52 to form discharge paths interconnecting the patterned electrodes 42, as shown in FIG. 9(*e*).

The discharge paths may be alternatively realized with a low-permittivity layer. After the step of FIG. 9(*d*), a low-permittivity layer is formed in the gap 44, neighboring the patterned electrodes 42 and the metallic blocks 48. Next, the second sub-insulating layer 54 is formed over the patterned electrodes 42, the metallic blocks 48 and the low-permittivity layer. Thus, the low-permittivity layer functions as the discharge paths.

Figure 10:
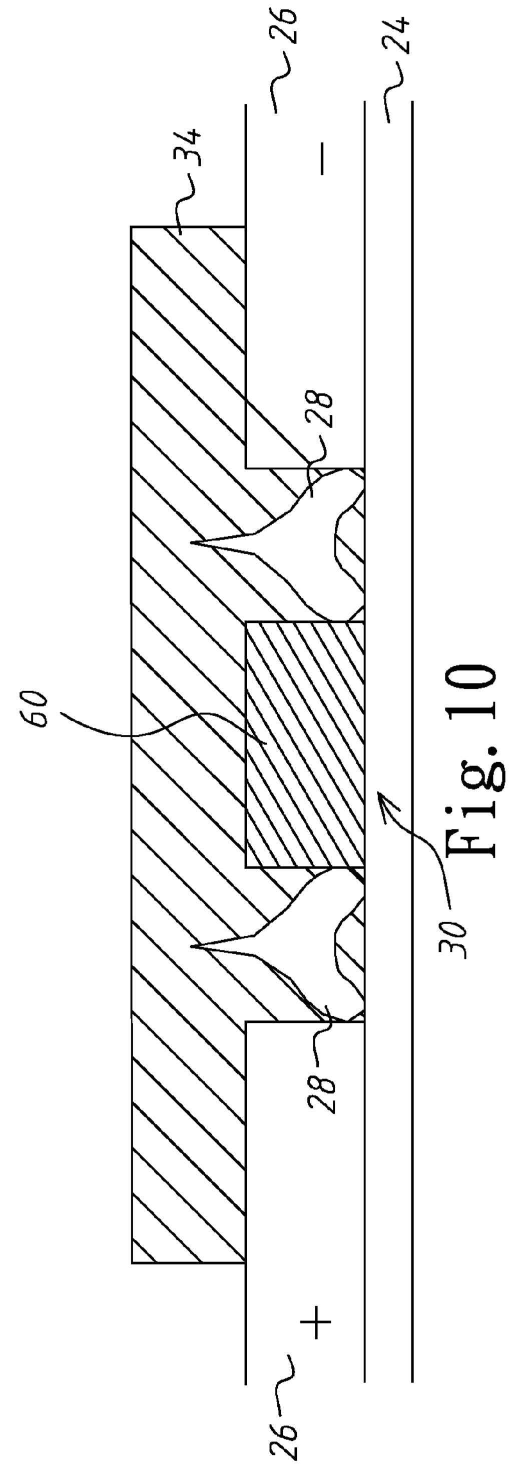
FIG. 10 is a sectional view schematically showing a planar micro-tube discharger structure according to a third embodiment of the present invention.
Figure 11:
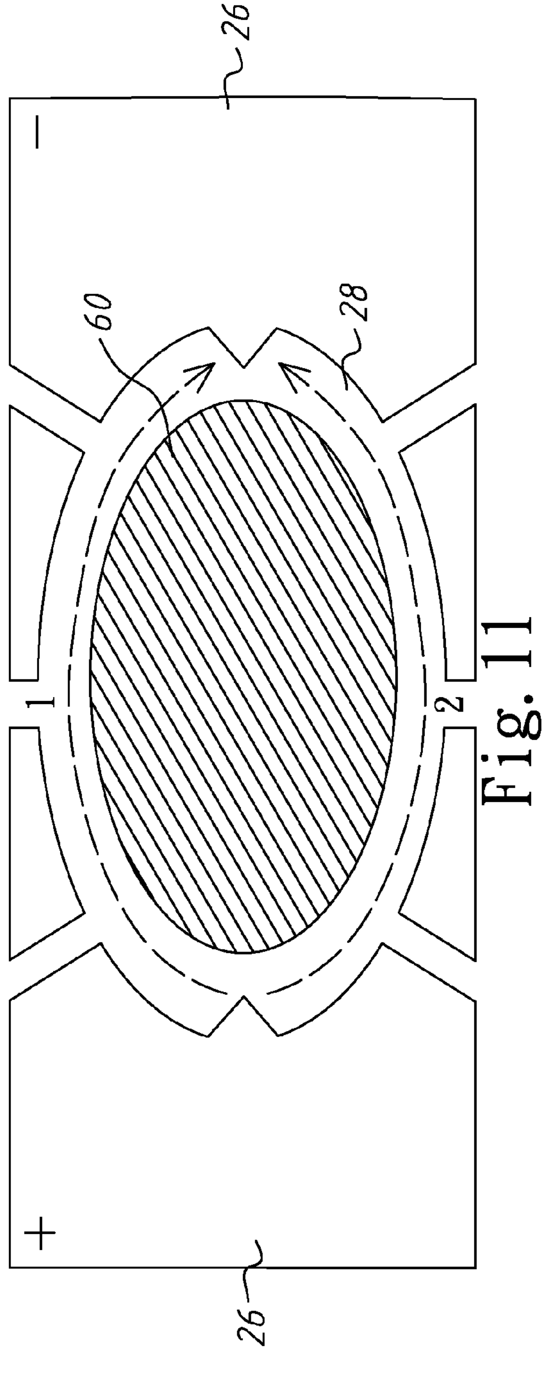
FIG. 11 is a diagram schematically showing patterned electrodes and a separating block of the planar micro-tube discharger structure according to the third embodiment of the present invention.

Below is introduced a third embodiment. Refer to FIG. 10 and FIG. 11. The third embodiment is basically similar to the first embodiment but different from the first embodiment in that the separating block 30 is an insulating block 60 comprising silicon dioxide or silicon nitride. The operation of the third embodiment is similar to that of the first embodiment.

In the third embodiment, the gap 28 does not contain any material except air. Alternatively, the gap 28 may be filled with a low-permittivity layer, and the first insulating layer 34 is formed over the low-permittivity layer, whereby discharge paths are created along the low-permittivity layer. The permittivity of the low-permittivity layer should be lower than that of the first insulating layer 34 and higher than that of the patterned electrodes 26.

Figure 12A:
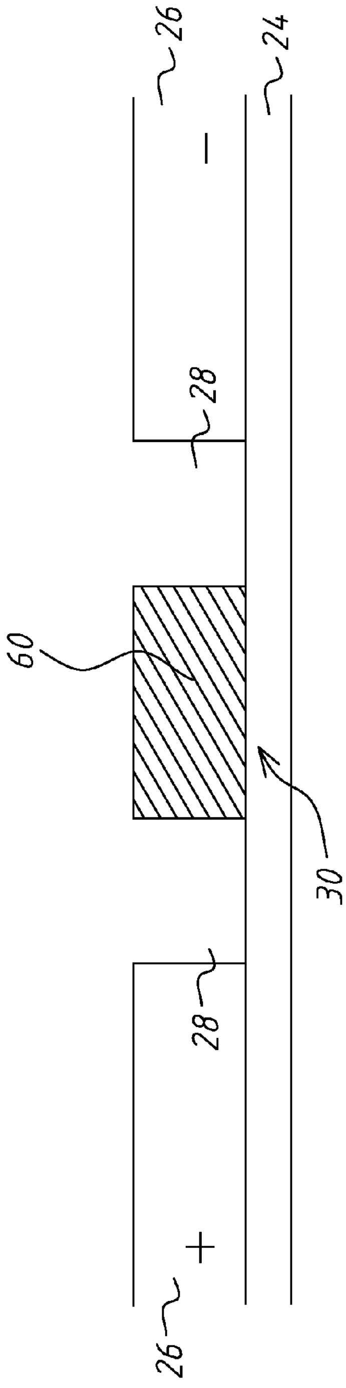
FIG. 12(*a*) and FIG. 12(*b*) are sectional views schematically showing the steps of fabricating the planar micro-tube discharger structure according to the third embodiment of the present invention.
Figure 12B:
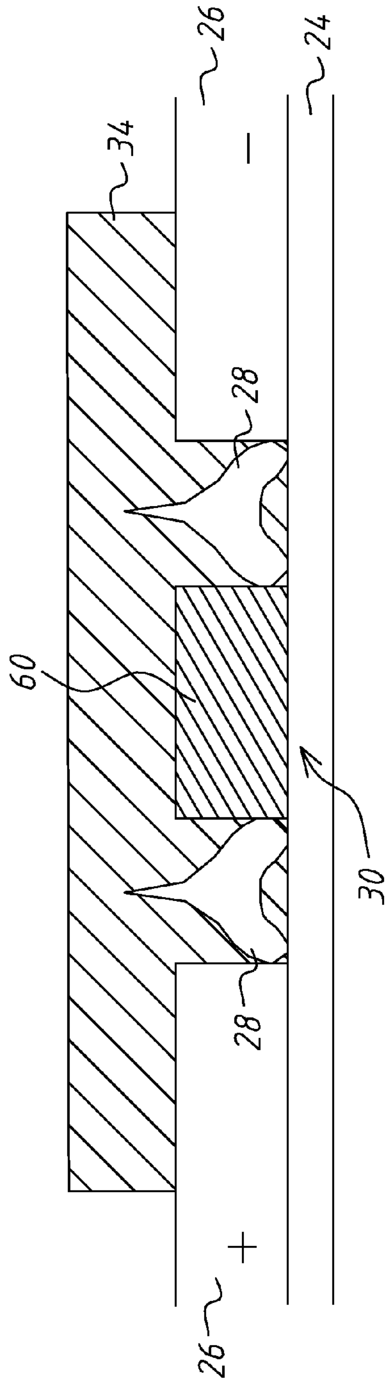

Below is introduced the process of fabricating the planar micro-tube discharger structure of the third embodiment. Refer to FIG. 12(*a*) and FIG. 12(*b*). Firstly, form patterned electrodes 26 and an insulating block 60 on a substrate 24, wherein the patterned electrodes 26 are separated by a gap 28, and wherein the insulating block 60 is arranged in the gap 28, as shown in FIG. 12(*a*). Next, use a CVD method to form a first insulating layer 34 over the patterned electrodes 26 and the insulating block 60 and till the insulating layer 34 into the gap 28, whereby air or inert gas is trapped in the gap 28 to function as the discharge paths interconnecting the patterned electrodes 26, as shown in FIG. 12(*b*).

The discharge paths may be alternatively realized with a low-permittivity layer. After the step of FIG. 12(*a*), a low-permittivity layer is formed in the gap 28, neighboring the patterned electrodes 26 and the insulating block 60. Next, the first insulating layer 34 is formed over the patterned electrodes 26, the insulating block 60 and the low-permittivity layer. Thus, the low-permittivity layer functions as the discharge paths.

Figure 13:
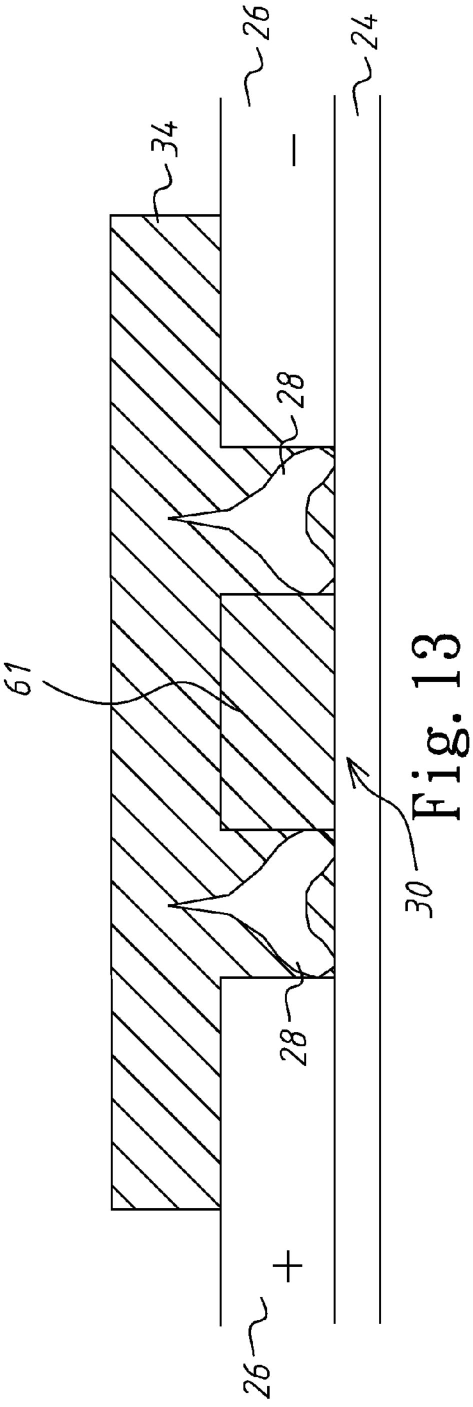
FIG. 13 is a sectional view schematically showing a planar micro-tube discharger structure according to a fourth embodiment of the present invention.
Figure 14:
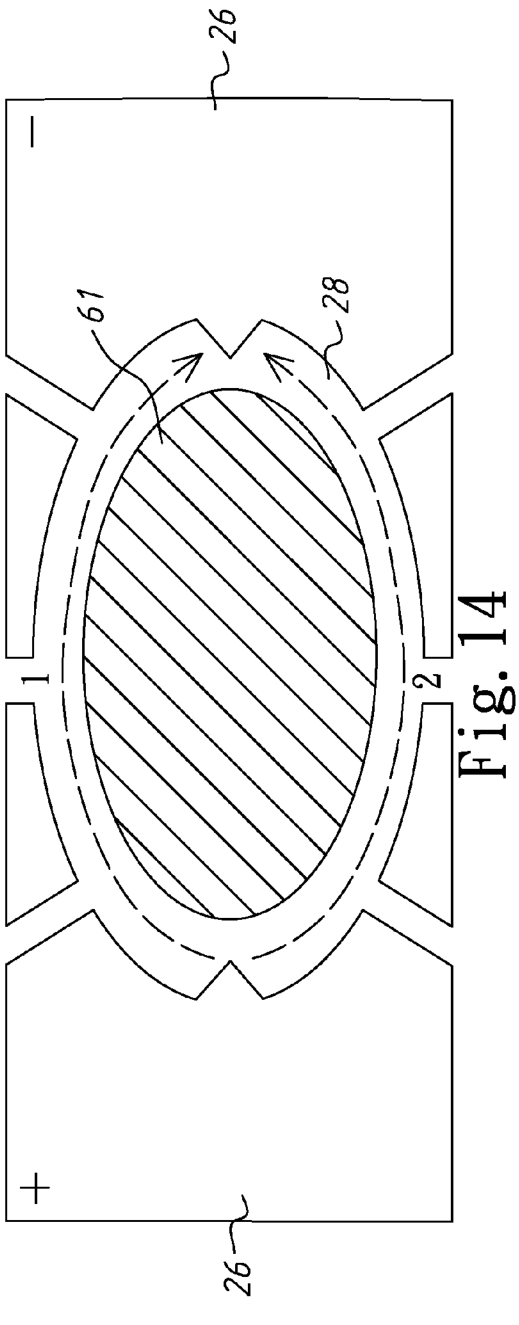
FIG. 14 is a diagram schematically showing patterned electrodes and a separating block of the planar micro-tube discharger structure according to the fourth embodiment of the present invention.

Below is introduced a fourth embodiment. Refer to FIG. 13 and FIG. 14. The fourth embodiment is basically similar to the third embodiment but different from the third embodiment in the material of the first insulating layer 34. In the fourth embodiment, the separating block 30 is an insulating block 61 made of the same material as the insulating layer 34. Therefore, the insulating block 61 and the insulating layer 34 have the same hatching lines. Besides, the operation of the fourth embodiment is similar to that of the third embodiment.

In the fourth embodiment, the gap 28 does not contain any material except air. Alternatively, the gap 28 may be filled with a low-permittivity layer, and the first insulating layer 34 is formed over the low-permittivity layer, whereby discharge paths are created along the low-permittivity layer. The permittivity of the low-permittivity layer should be lower than that of the first insulating layer 34 and higher than that of the patterned electrodes 26.

Figure 15A:
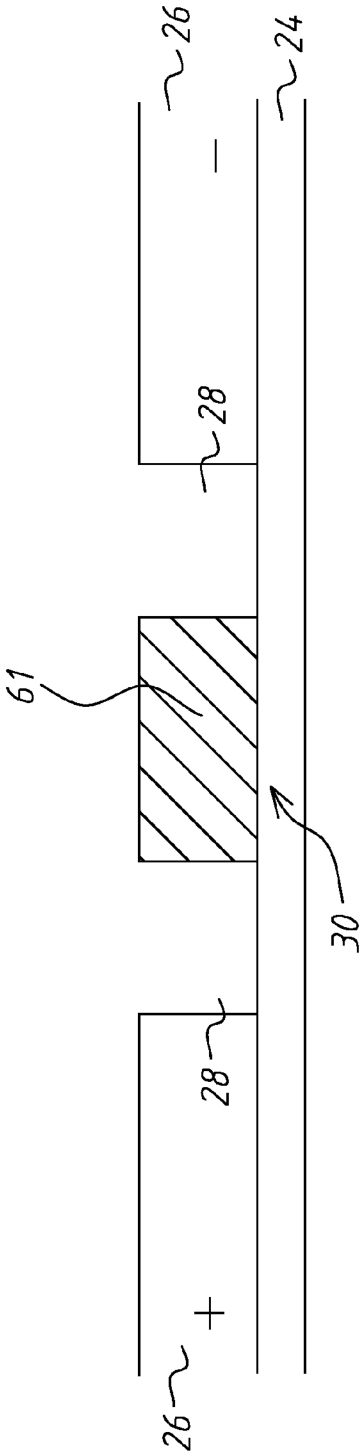
FIG. 15(*a*) and FIG. 15(*b*) are sectional views schematically showing the steps of fabricating the planar micro-tube discharger structure according to the fourth embodiment of the present invention.
Figure 15B:
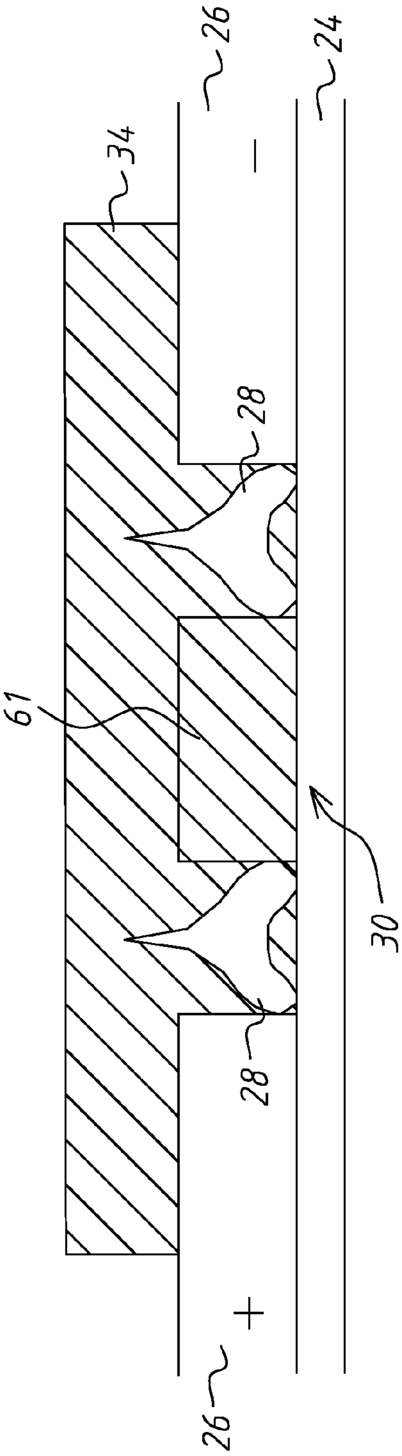

Below is introduced the process of fabricating the planar micro-tube discharger structure of the fourth embodiment. Refer to FIG. 15(*a*) and FIG. 15(*b*). Firstly, form patterned electrodes 26 and an insulating block 61 on a substrate 24, wherein the patterned electrodes 26 are separated by a gap 28, and wherein the insulating block 61 is arranged in the gap 28, as shown in FIG. 15(*a*). Next, use a CVD method to form a first insulating layer 34 over the patterned electrodes 26 and the insulating block 61 and fill the insulating layer 34 into the gap 28, whereby air or inert gas is trapped in the gap 28 to function as the discharge paths interconnecting the patterned electrodes 26, as shown in FIG. 15(*b*).

The discharge paths may be alternatively realized with a low-permittivity layer. After the step of FIG. 15(*a*), a low-permittivity layer is formed in the gap 28, neighboring the patterned electrodes 26 and the insulating block 61. Next, the first insulating layer 34 is formed over the patterned electrodes 26, the insulating block 61 and the low-permittivity layer. Thus, the low-permittivity layer functions as the discharge paths.

Figure 16:
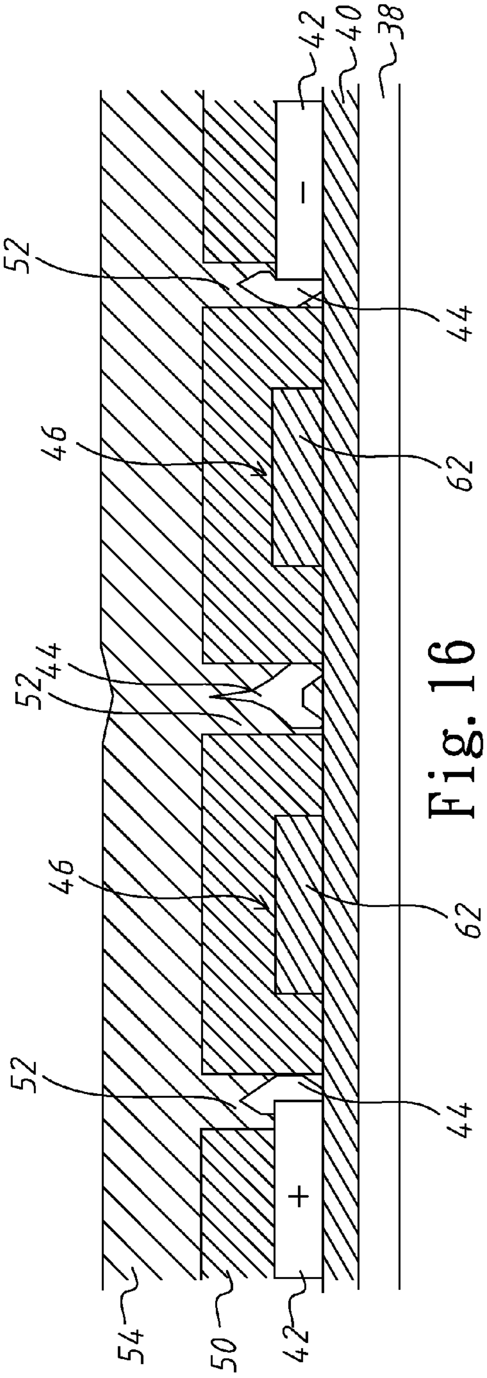
FIG. 16 is a sectional view schematically showing a planar micro-tube discharger structure according to a fifth embodiment of the present invention.
Figure 17:
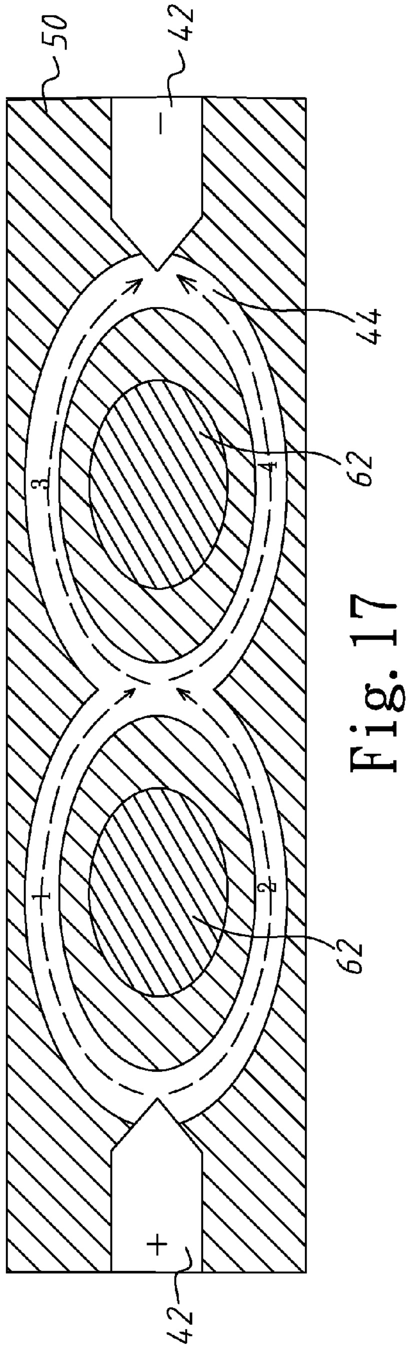
FIG. 17 is a diagram schematically showing patterned electrodes, separating blocks and a first sub-insulating layer of the planar micro-tube discharger structure according to the fifth embodiment of the present invention.
Figure 18A:
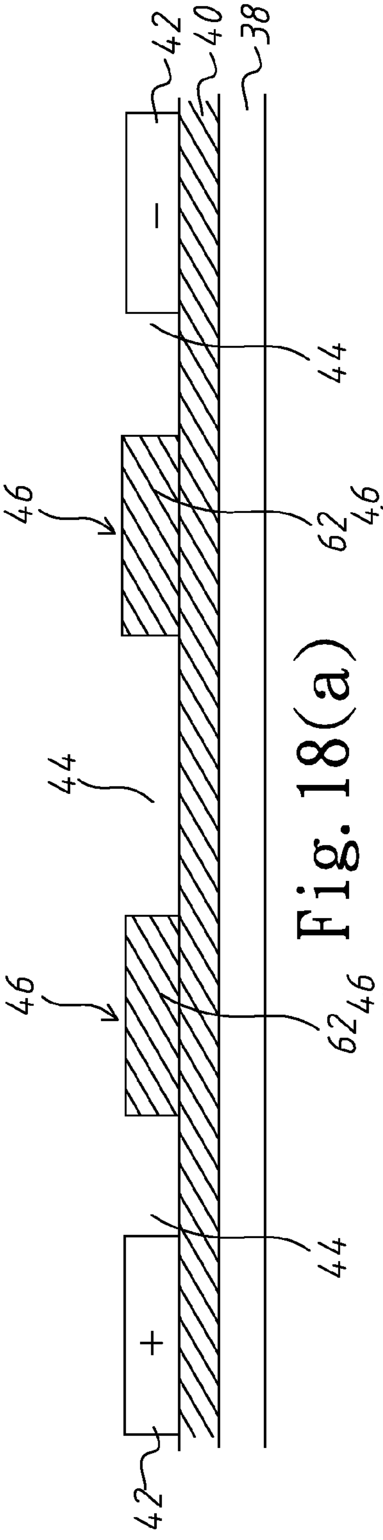
FIGS. 18(*a*)-18(*d*) are sectional views schematically showing the steps of fabricating the planar micro-tube discharger structure according to the fifth embodiment of the present invention.
Figure 18B:
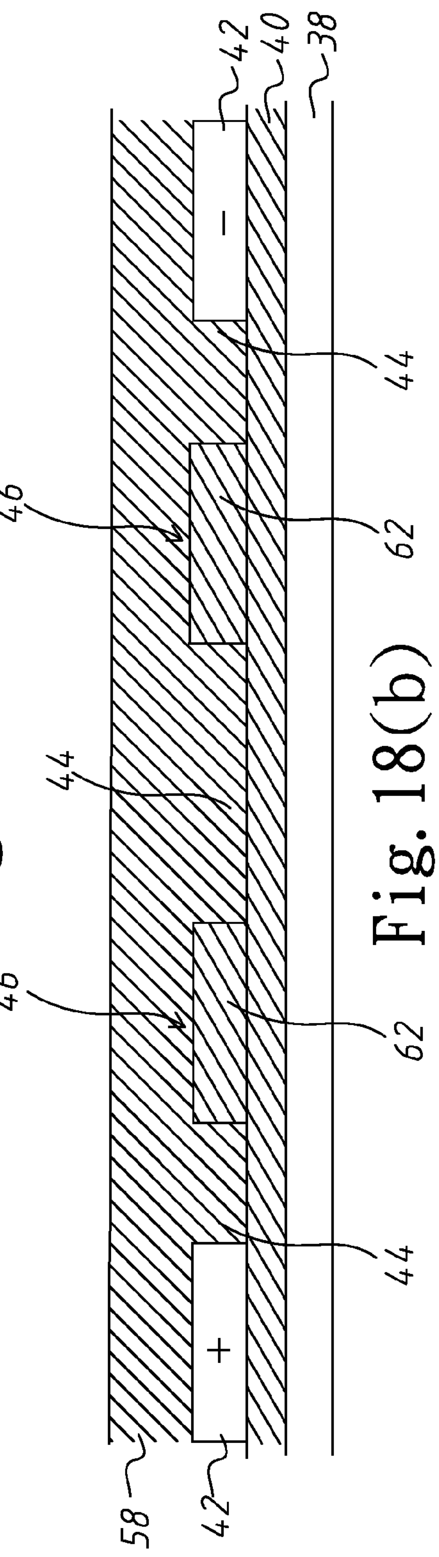
Figure 18C:
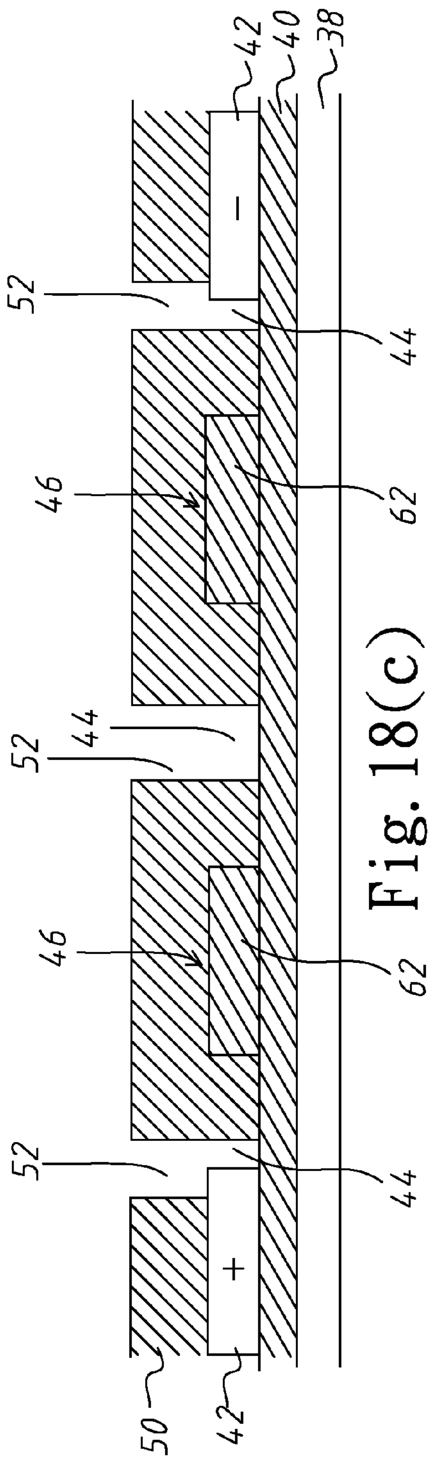
Figure 18D:
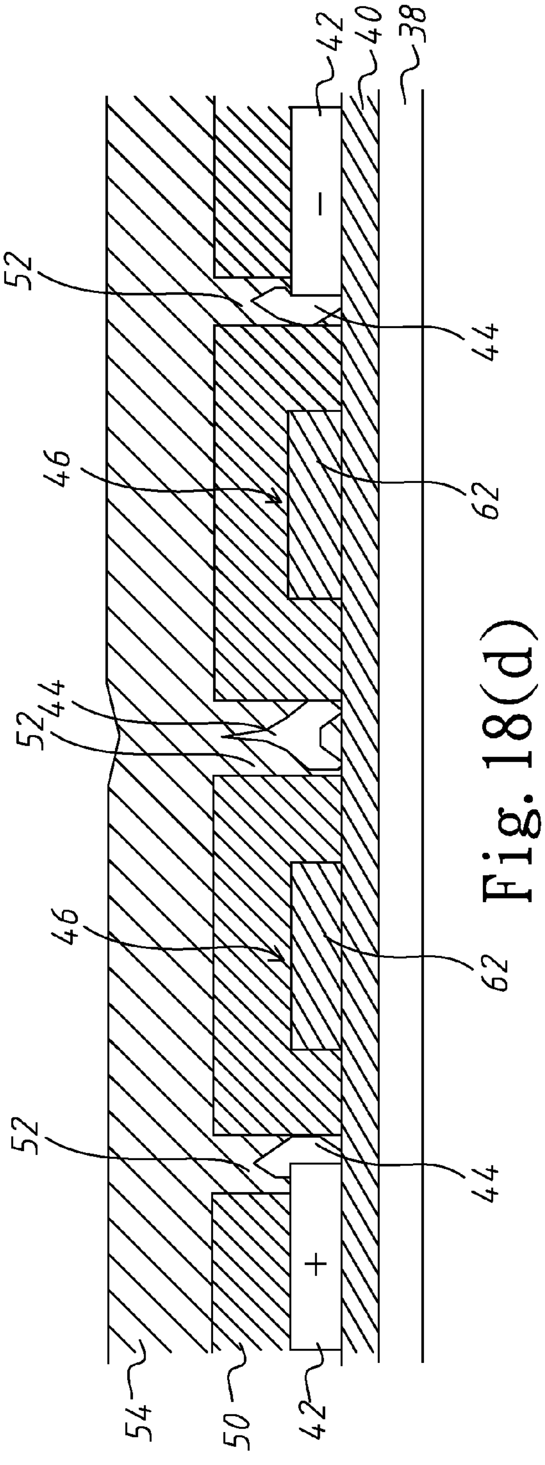

Below is introduced a fifth embodiment. Refer to FIG. 16 and FIG. 17. The fifth embodiment is basically similar to the second embodiment but different from the second embodiment in the material of the separating blocks 46. In the fifth embodiment, the separating blocks 46 are insulating blocks 62 comprising silicon dioxide or silicon nitride. When the potential of the two patterned electrodes 42 reaches the breakdown electric field intensity of the gap 44, tips discharge with the discharge current proceeding from one tip to another tip along the discharge paths.

In the fifth embodiment, the gap 44 does not contain any material except air. Alternatively, the gap 44 may be filled with a low-permittivity layer, and the second sub-insulating layer 54 is formed over the low-permittivity layer, whereby discharge paths are created along the low-permittivity layer. The permittivity of the low-permittivity layer should be lower than that of the first sub-insulating layer 50 and the second sub-insulating layer 54 and higher than that of the patterned electrodes 42.

Below is introduced the process of fabricating the planar micro-tube discharger structure of the fifth embodiment. Refer to FIGS. 18(*a*)-18(*d*). Firstly, form a second insulating layer 40, patterned electrodes 42, and insulating blocks 62 on a substrate 38, wherein the patterned electrodes 42 are separated by a gap 44, and wherein the insulating blocks 62 are arranged in the gap 44, as shown in FIG. 18(*a*). Next, form an inner insulating layer 58 over the patterned electrodes 42 and the insulating blocks 62 and fill the inner insulating layer 58 into the gap 44, as shown in FIG. 18(*b*). Next, remove a portion of the inner insulating layer 58 in the region of the gap 44 to form over the patterned electrodes 42 and the insulating blocks 62 a first sub-insulating layer 50 having a groove 52 interconnecting the patterned electrodes 42, as shown in FIG. 18(*c*). Next, use a CVD method to form a second sub-insulating layer 54 over the first sub-insulating layer 50 and fill the second sub-insulating layer 54 into the groove 52, whereby air or inert gas is trapped in the groove 52 to form discharge paths interconnecting the patterned electrodes 42, as shown in FIG. 18(*d*).

The discharge paths may be alternatively realized with a low-permittivity layer. After the step of FIG. 18(*c*), a low-permittivity layer is formed in the gap 44, neighboring the patterned electrodes 42 and the insulating blocks 62. Next, the second sub-insulating layer 54 is formed over the patterned electrodes 42, the insulating blocks 62 and the low-permittivity layer. Thus, the low-permittivity layer functions as the discharge paths.

Figure 19:
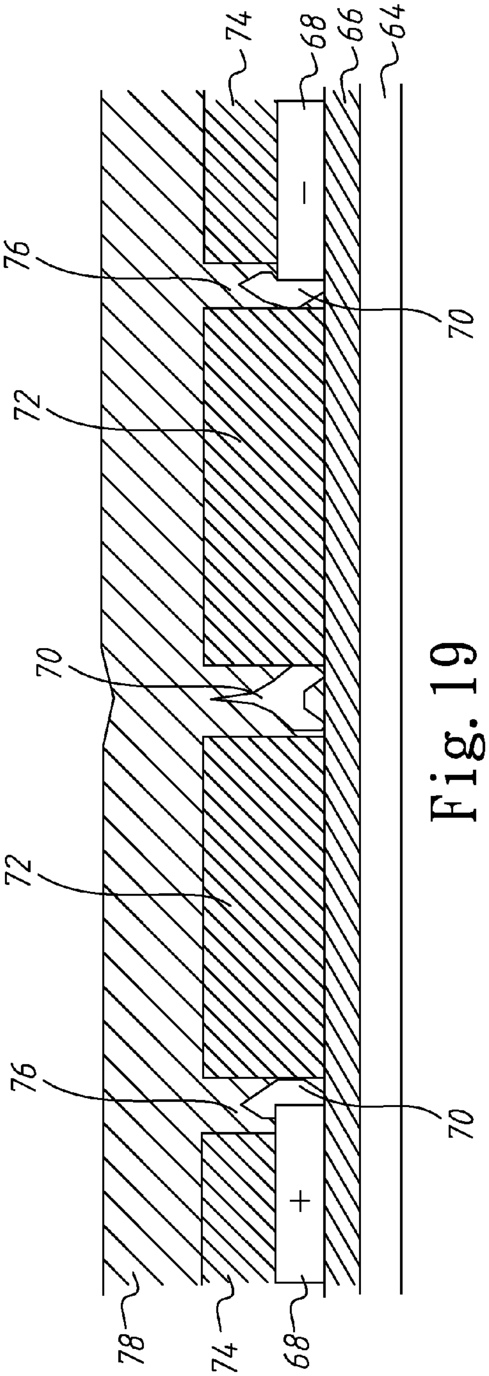
FIG. 19 is a sectional view schematically showing a planar micro-tube discharger structure according to a sixth embodiment of the present invention.
Figure 20:
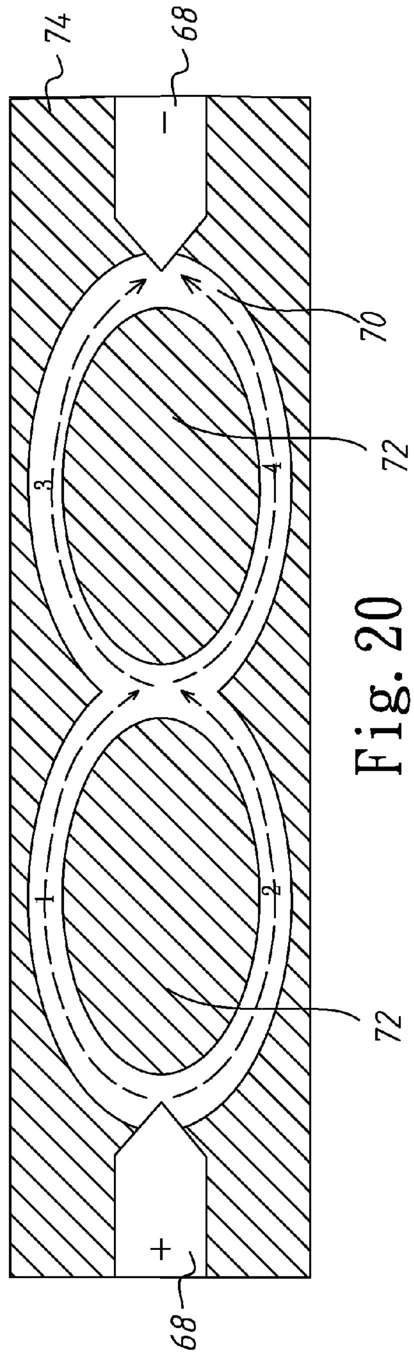
FIG. 20 is a diagram schematically showing patterned electrodes, separating blocks and cover blocks of the planar micro-tube discharger structure according to the sixth embodiment of the present invention.
Figure 21A:
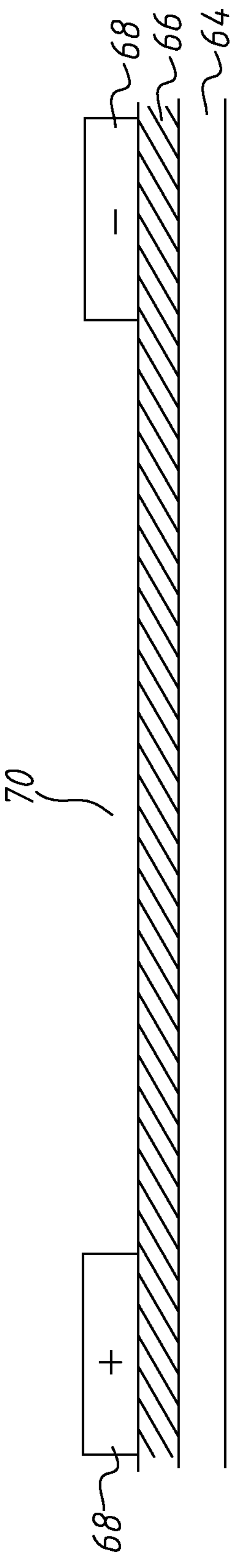
FIGS. 21(*a*)-21(*d*) are sectional views schematically showing the steps of fabricating the planar micro-tube discharger structure according to the sixth embodiment of the present invention.
Figure 21B:
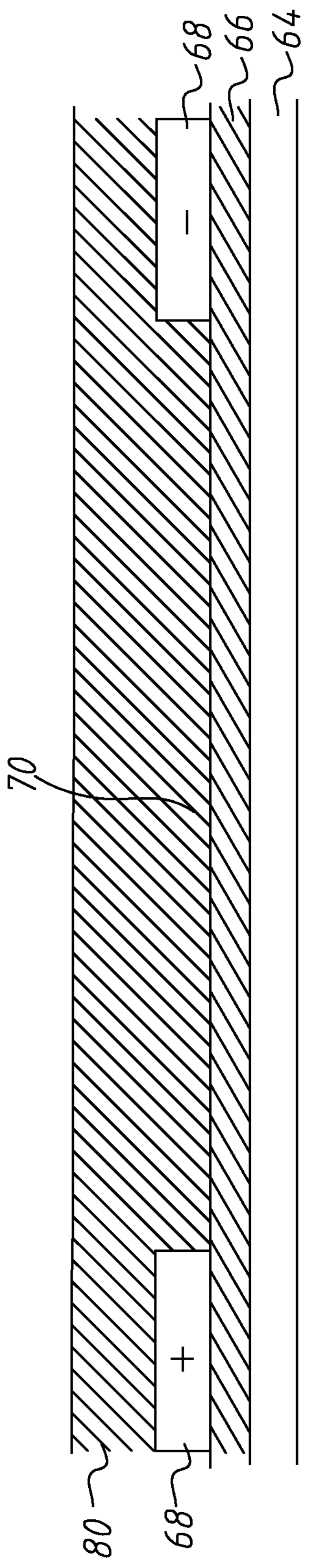
Figure 21C:
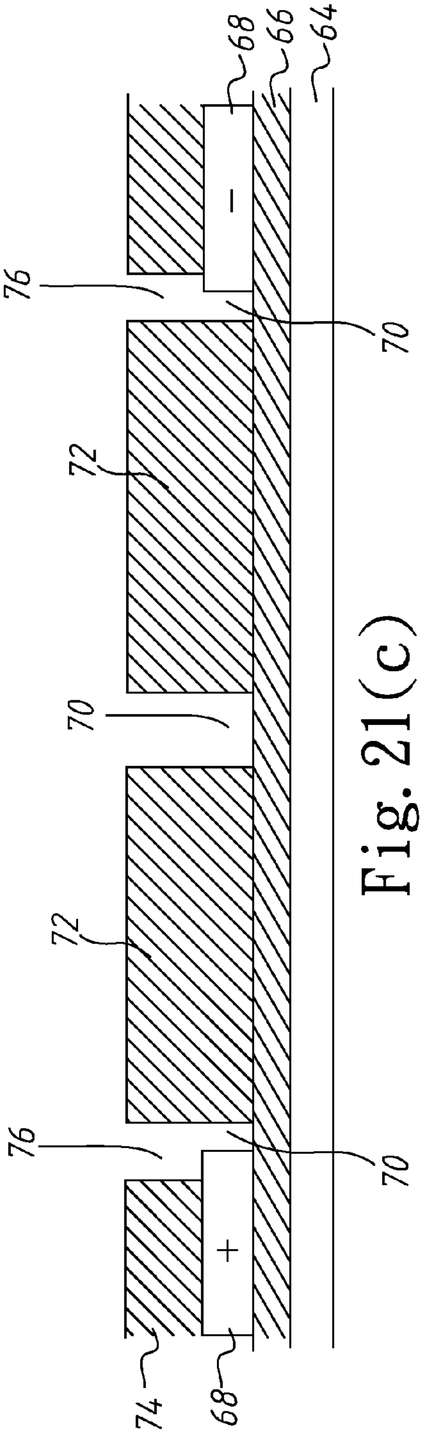
Figure 21D:
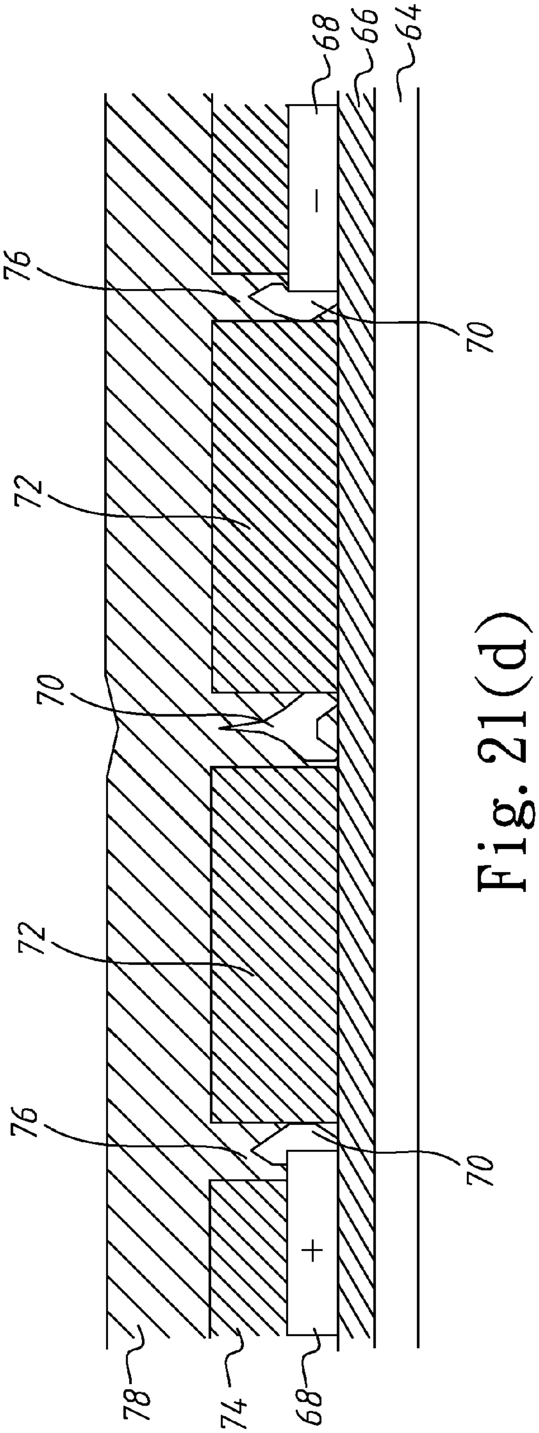

Below is introduced a sixth embodiment. Refer to FIG. 19 and FIG. 20. In the sixth embodiment, the planar micro-tube discharger structure comprises a substrate 64 made of silicon; a second insulating layer 66 comprising silicon dioxide or silicon nitride and formed on the substrate 64; two patterned electrodes 68 formed on second insulating layer 66 and separated by a gap 70; at least one separating block 72 arranged in the gap 70; two cover blocks 74 respectively arranged on the patterned electrodes 68 and each separated from the neighboring separating block 72 by a sub-gap 76 that interconnects the gap 70 and the patterned electrode 68; and a first insulating layer 78 comprising silicon dioxide or silicon nitride, formed over the cover blocks 74 and the separating blocks 72, and filled into the gap 70 and the sub-gaps 76. The gap 70 and the sub-gaps 76 contain air or inert gas. The air or inert gas is trapped in the gap 70 and the sub-gaps 76 by the first insulating layer 78 to function as discharge paths. The patterned electrodes 68 discharge via the discharge paths. In the sixth embodiment, the planar micro-tube discharger structure has two separating block 72 and four discharge paths. The operation of the sixth embodiment is similar to that of the fifth embodiment.

In the sixth embodiment, the gap 70 does not contain any material except air. Alternatively, the gap 70 may be filled with a low-permittivity layer, and the first insulating layer 78 is formed over the low-permittivity layer, whereby discharge paths are created along the low-permittivity layer. The permittivity of the low-permittivity layer should be lower than that of the first insulating layer 78 and higher than that of the patterned electrodes 68.

Figure 1:
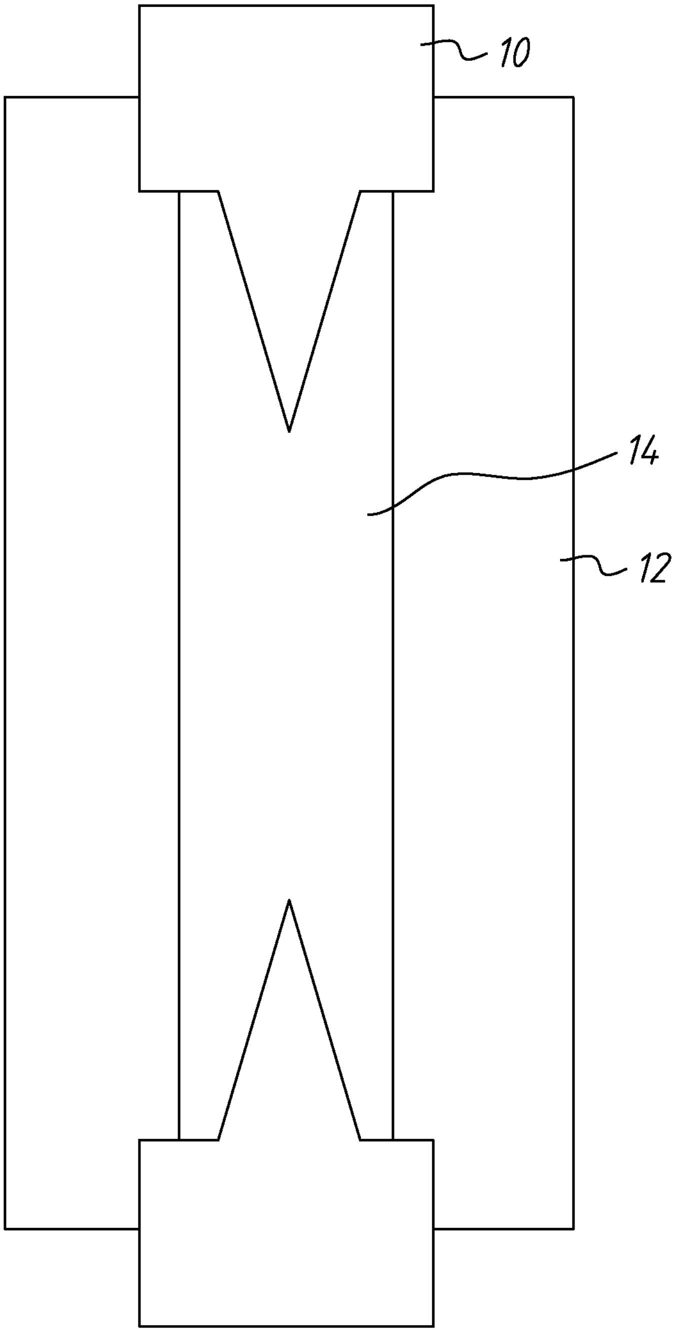
Fig. 1(prior art)
FIG. 1 schematically shows a conventional gas tube.

Below is introduced the process of fabricating the planar micro-tube discharger structure of the sixth embodiment. Refer to FIGS. 1(*a*)-21(*d*). Firstly, sequentially form a second insulating layer 66 and patterned electrodes 68 on a substrate 64, wherein the patterned electrodes 68 are separated by a gap 70, as shown in FIG. 21(*a*). Next, form an inner insulating layer 80 over the patterned electrodes 68 and the substrate 64 and fill the inner insulating layer 80 into the gap 70, as shown in FIG. 21(*b*). Next, remove a portion of the inner insulating layer 80 in the region of the gap 70 to form separating blocks 72 and cover blocks 74 respectively covering the patterned electrodes 68, wherein each cover block 74 is separated from the neighboring separating block 72 by a sub-gap 76 that interconnects the gap 70 and the patterned electrode 68, as shown in FIG. 21(*c*). Next, use a CVD method to form a first insulating layer 78 over the cover blocks 74 and the separating blocks 72 and fill the first insulating layer 78 into the gap 70 and the sub-gaps 76, whereby air or inert gas is trapped in the gap 70 and the sub-gaps 76 to form discharge paths interconnecting the patterned electrodes 68, as shown in FIG. 21(*d*).

The discharge paths may be alternatively realized with a low-permittivity layer. After the step of FIG. 21(*c*), a low-permittivity layer is formed in the gap 70, neighboring the patterned electrodes 68 and the separating blocks 72. Next, the first insulating layer 78 is formed over the cover blocks 74, the separating blocks 72 and the low-permittivity layer. Thus, the low-permittivity layer functions as the discharge paths.

Figure 22:
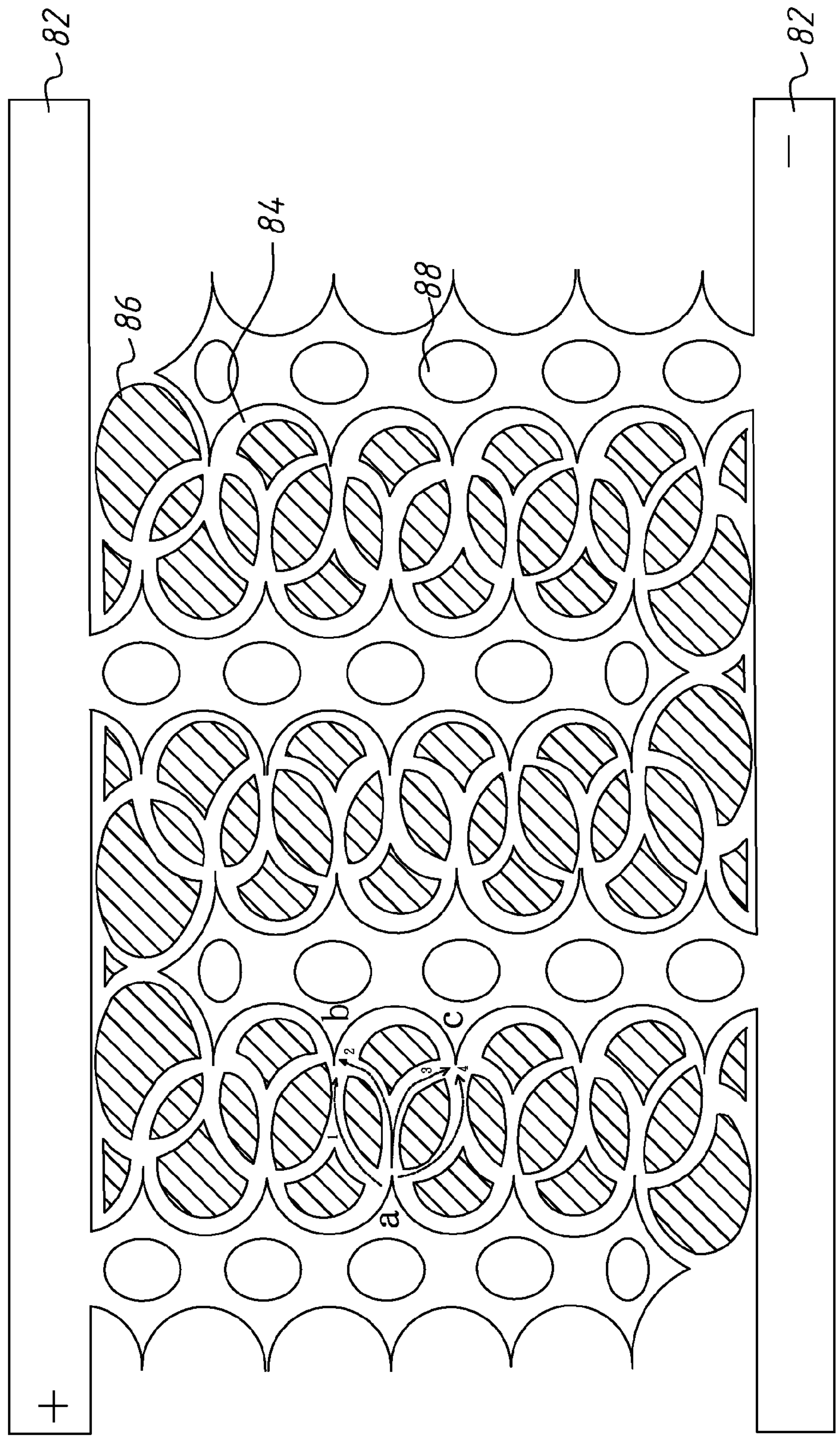
FIG. 22 is a diagram schematically showing patterned electrodes and separating blocks of a planar micro-tube discharger structure according to the present invention.

Summarized from the abovementioned embodiments, the primary structure of the present invention is shown in FIG. 22. The primary structure of the present invention comprises two patterned electrodes 82 separated by a gap 84, and a plurality of separating blocks 86, whereby is formed a plurality of discharge paths. Further, at least one cavity 88 is formed in each patterned electrode 82 when the patterned electrodes are formed on the substrate, whereby the tip electric field of each patterned electrode 82 is distributed more uniformly.

In conclusion, the micro-tube discharger structure of the present invention has a plurality of discharge paths to release electrostatic charge. In comparison with the conventional gas tube, the present invention has a much lower dropout rate.

The embodiments described above are only to exemplify the present invention but not to limit the scope of the present invention. Any equivalent modification or variation according to the shapes, structures, characteristics or spirit of the present invention is to be also included within the scope of the present invention.

What is claimed is:

1. A method for fabricating a planar micro-tube discharger structure, comprising steps:

forming on a substrate two patterned electrodes separated by a gap and at least one separating block arranged in said gap; and forming a first insulating layer over said patterned electrodes and said separating block and filling said first insulating layer into said gap to create at least two discharge paths interconnecting said patterned electrodes.

2. The method for fabricating a planar micro-tube discharger structure according to claim 1, wherein said step of forming said first insulating layer over said patterned electrodes and said separating block and filling said first insulating layer into said gap to create said discharge paths further comprises steps:

forming an inner insulating layer over said patterned electrodes and said separating block and completely filling said gap with said inner insulating layer;

removing a portion of said inner insulating layer located inside said gap to form on said patterned electrodes and said separating block a first sub-insulating layer having a groove interconnecting said patterned electrodes; and forming a second sub-insulating layer over said first sub-insulating layer and filling said second sub-insulating layer into said groove to create said discharge paths, whereby said first insulating layer is formed over said patterned electrodes and said separating block.

3. The method for fabricating a planar micro-tube discharger structure according to claim 2, wherein after said step of forming said inner insulating layer over said patterned electrodes and said separating block, a low-permittivity layer is formed in said groove to neighbor said patterned electrodes, whereafter said second sub-insulating layer is formed over said first sub-insulating layer and said low-permittivity layer to make said low-permittivity layer function as said discharge paths.

4. The method for fabricating a planar micro-tube discharger structure according to claim 2, wherein said second sub-insulating layer is formed with a chemical vapor deposition method.

5. The method for fabricating a planar micro-tube discharger structure according to claim 2, wherein said gap contains air or inert gas, and wherein said air or inert gas is trapped in said gap to form said discharge paths.

6. The method for fabricating a planar micro-tube discharger structure according to claim 1, wherein said patterned electrodes are metallic patterned electrodes, and wherein said separating block is a metallic block, and wherein said step of forming said patterned electrodes and said separating block on said substrate further comprises steps:

forming a metallic layer on said substrate; and removing a portion of said metallic layer to form said metallic patterned electrodes and said metallic block on said substrate.

7. The method for fabricating a planar micro-tube discharger structure according to claim 1, wherein in said step of forming said patterned electrodes on said substrate, at least one cavity is formed in each said patterned electrode.

8. The method for fabricating a planar micro-tube discharger structure according to claim 1, wherein said separating block is an insulating block.

9. The method for fabricating a planar micro-tube discharger structure according to claim 1, wherein before said step of forming said patterned electrodes and said separating block on said substrate, a second insulating layer is formed on said substrate, and then said patterned electrodes and said separating block are formed on said second insulating layer.

10. The method for fabricating a planar micro-tube discharger structure according to claim 1, wherein after said step of forming said patterned electrodes and said separating block on said substrate, a low-permittivity layer is formed inside said gap to neighbor said patterned electrodes, whereafter said first insulating layer is formed over said patterned electrodes, said separating block and said low-permittivity layer to make said low-permittivity layer function as said discharge paths.

11. The method for fabricating a planar micro-tube discharger structure according to claim 1, wherein said first insulating layer is formed with a chemical vapor deposition method.

12. The method for fabricating a planar micro-tube discharger structure according to claim 1, wherein said gap contains air or inert gas, and wherein said air or inert gas is trapped in said gap to form said discharge paths.

13. The method for fabricating a planar micro-tube discharger structure according to claim 1, wherein said step of forming said patterned electrodes and said separating block on said substrate further comprises steps:

forming said patterned electrodes on said substrate;

forming an inner insulating layer over said patterned electrodes and said substrate and filling said inner insulating layer into said gap; and removing a portion of said inner insulating layer located inside said gap to form said separating block and cover blocks respectively arranged on said patterned electrodes, wherein a sub-gap separates said cover block from said separating block neighboring said cover block and interconnects with said gap and said patterned electrodes.

14. The method for fabricating a planar micro-tube discharger structure according to claim 13, wherein said step of forming said first insulating layer over said patterned electrodes and said separating block and filling said first insulating layer into said gap to create said discharge paths is forming said first insulating layer over said cover blocks and said separating block and filling said first insulating layer into said gap and said sub-gap to create said discharge paths.

* * * * *